United States Patent Office 2,802,750
Patented Aug. 13, 1957

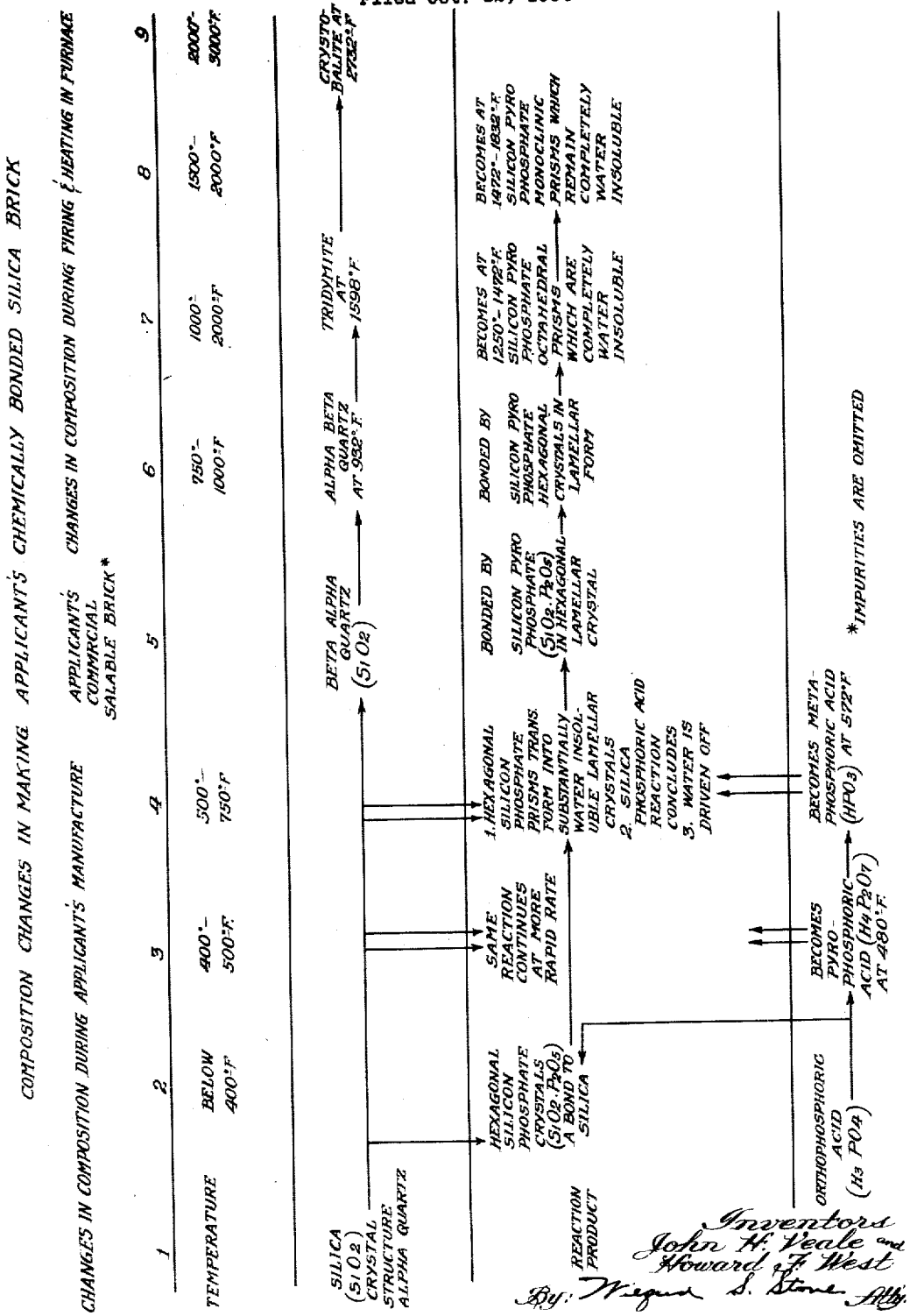

2,802,750
METHOD OF MAKING PHOSPHATE BONDED SILICA REFRACTORY BODY

John H. Veale, Coal City, and Howard F. West, Joliet, Ill., assignors to Illinois Clay Products Company, Joliet, Ill., a corporation of Illinois Application October 12, 1954, Serial No. 461,928

3 Claims. (Cl. 106—69)

This invention relates to a method of making a phosphate bonded silica refractory body and more particularly relates to a method of making a phosphate bonded silica brick.

In our co-pending application Serial No. 255,876, filed May 18, 1953, there is disclosed a method of making a silica brick in which granulated silica is mixed with pyro or meta phosphoric acid, the composition dry pressed into shape and then heated at a temperature between approximately 680° F. and 900° F. This produces a strong, refractory, dense and otherwise highly satisfactory brick suitable, for example, in forming the roof of an open hearth furnace. The strength of this brick is due largely to the formation of silicon pyro phosphate ($SiP_2O_7$ or $SiO_2.P_2O_5$) which bonds together the silica particles. However, pyro and meta phosphoric acids are expensive and the process of making the brick with these materials is time-consuming and difficult due largely to the viscous nature of the pyro and meta phosphoric acids.

Ortho phosphoric acid is relatively inexpensive and can be mixed into the silica composition without difficulty but the dried bricks are weak and there is excessive breakage in shipment. Increasing the amount of ortho phosphoric acid to increase the phosphate or $P_2O_5$ content also increases the water content and the net result is still a weak product.

We have discovered that by mixing with the silica particles both ortho phosphoric acid and a phosphate salt, such as calcium, magnesium, or iron phosphate, bricks can be made having substantially the same strength, refractoriness and density characteristics as the bricks made with pyro or meta phosphoric acid and at a cost that is very much lower. The water content of the mixture should be kept sufficiently low so as to produce silicon pyro phosphate rather than silicon ortho phosphate, and the total phosphate content of the mixture should be sufficiently high so as to give a substantial amount of silicon pyro phosphate to provide adequate bond strength. In numerical amounts the phosphate content of the mixture expressed as $P_2O_5$ should be at least 4% by weight and the water content of the acid should be such that the ratio of $H_2O$ to $H_3PO_4$ is not more than 1:3 by weight.

The minimum $P_2O_5$ content will vary slightly with the grain size of the silica particles, the 4% $P_2O_5$ content being used for relatively coarse ground ganister, whereas for fine ground silica particles 6% by weight $P_2O_5$ or even higher would be preferable. For silica of particle size such as, roughly, 50% of plus 50 mesh and 50% minus 50 mesh, a $P_2O_5$ content of 6% to 15% gives satisfactory results.

In order to obtain particularly high refractory characteristics, it is advisable to use substantially pure silica. The CaO content of the mixture of silica and phosphate for high refractory characteristics should not exceed 1.5% by weight (free lime plus CaO content of the calcium phosphate). This is not difficult to do since almost all silicas contain less than ½% of lime. With some sacrifice in refractory qualities the process of this invention, however, can even be carried out with silica-lime mixtures used for making the fired silica bricks in present common use.

Any type of phosphate salt may be used with the ortho phosphoric acid in the practice of this invention although, of course, the sodium and potassium phosphates would not ordinarily be used because of their high fluxing properties. The alkaline earth phosphates are preferred, such as monobasic calcium phosphate, $Ca(H_2PO_4)_2$; dibasic calcium phosphate ($CaHPO_4$); and tribasic calcium phosphate $Ca_3(PO_4)_2$. The corresponding magnesium phosphates may be used. Also suitable are iron phosphates. Ammonium phosphates and carbamine phosphates are suitable and add no fluxing agents to the bricks, but these materials are relatively expensive.

In carrying out one embodiment of the invention, a dry powdered calcium phosphate is mixed with granulated silica in its ordinary alpha quartz crystalline state and to the mixture is added concentrated 85% ortho phosphoric acid. The mixture of granulated silica, calcium phosphate and ortho phosphoric acid is then dry pressed in the shape of a brick or other body, and then heated at a temperature of approximately 680° F. to react the $P_2O_5$ of the phosphoric acid and phosphate salt with at least the surface of the silica particles to form silicon pyro phosphate ($SiP_2O_7$ or $SiO_2.P_2O_5$). The silicon pyro phosphate formed at 680° F. and above is in the form of lamellae and is less soluble and more water resistant than prismatic-silicon phosphate which forms at lower temperatures.

The above process produces a chemically bonded, unfired silica brick. The silica remains in the alpha quartz form due to the fact that the temperature of 680° F. is not sufficient to bring about the change to the tridymite or crystobalite crystalline forms. Temperatures of 680° F. to 900° F. are commonly used for producing the unfired bricks. At a temperature of about 932° F. the alpha quartz starts to convert to beta quartz, at 1598° F. the beta quartz converts to tridymite, and at 2732° F. crystobalite is formed.

The unfired silica brick prepared as above described is composed of silica particles bonded together with what is believed to be silicon pyro phosphate. Its density is much higher than that of silica bricks made by mixing together silica particles with lime and firing at temperatures of 2500° F. and above. The applicants' unfired brick will undergo considerably more crystalline expansion than fired bricks. It has been found, however, that applicants' phosphate bonded, unfired bricks can be used to form the roof of an open hearth furnace and because of the pressure placed upon them by the restraining members, the expansion will be to a considerable extent taken up by the pores of the bricks when the open hearth furnace is brought to temperatures in ordinary use.

While the phosphate bonded process is particularly suitable for making unfired silica bricks, it may also be used for making the fired silica bricks. The dry-pressed composition of silica, phosphate salt, and ortho phosphoric acid may be first dried, preferably at a temperature of 680° F. to 900° F., and the dried bricks then placed in a kiln and heated to above 2500° F. but below 3000° F. to convert the alpha quartz to the crystobalite form. This gives a brick having minimum expansion under service conditions. We may also produce a low expansion brick by forming granulated crystobalite, mixing this with the phosphate salt and ortho phosphoric acid, dry pressing and drying, preferably at above 680° F.

Bricks can be produced by drying at temperatures below 680° F., such as at 300° F. for several hours until most of the water is driven off, but in order to obtain maximum water resistance the temperature should be raised to at least 680° F., at which temperature a lamellar form of silicon pyro phosphate is formed which is more water resistant than the silicon pyro phosphate produced at lower temperatures.

The accompanying drawing shows the changes in the components of applicants' brick from the time it is mixed to the time it is in salable form, that is, column 5, and then the changes that occur in the first heating after use in a furnace.

In the following examples, the granulated silica is in the alpha quartz form and consists of 90% ganister and 10% silica flour, the silica flour having a grain size such as will pass through a 200 mesh screen, that is, 100% minus 200. The ganister had the following screen analysis:

|  | Ganister |
|---|---|
| − 4 + 6 | 5.4 |
| − 6 + 12 | 21.2 |
| − 12 + 20 | 17.7 |
| − 20 + 30 | 7.7 |
| − 30 + 40 | 7.5 |
| − 40 + 50 | 8.8 |
| − 50 + 70 | 8.6 |
| − 70 + 100 | 7.2 |
| − 100 + 140 | 5.5 |
| − 140 + 200 | 3.4 |
| − 200 + 270 | 2.1 |
| − 270 | 4.9 |
|  | 100% |

Substantially dry powdered calcium phosphates were used.

Example I

4% by weight of $Ca(H_2PO_4)_2$ was added to a mixture consisting of 90% fine ganister and 10% silica flour. This was then dry mixed to give a uniform composition and there was then added to the composition 7% by weight of a 75% concentrated orthophosphoric acid. The composition was pressed into a brick at a pressure of 3000 p. s. i. and the brick so formed was heated at a temperature of 700° F. for three hours. The modulus of rupture of the brick was 1400 p. s. i. The density of the bricks was 1.20 oz. per cu. in. Chemical and physical analyses of the bricks show that they consisted of granules of silica in alpha quartz crystalline form bonded together by lamellar silicon pyro-phosphate. Calcium silicate crystals were also present. Testing of these bricks as a part of the roof of an open hearth furnace showed that they wore away under actual service conditions at a much slower rate than the ordinary fired silica lime bricks.

Example II

The process of Example I was repeated using 3% of $Ca(H_2PO_4)_2$ instead of 4% by weight; 8% of $H_3PO_4$ instead of 7% and in addition adding ½% of CaO. The modulus of rupture of this brick was 1300 p. s. i. The density was the same, namely 1.20 oz. per cu. in. and the bricks also gave highly satisfactory results in the roof of an open hearth furnace.

Example III

The process of Example I was again repeated using 2.5 $CaHPO_4$ in place of the 4% $Ca(H_2PO_4)_2$. The results were very much the same except the modulus of rupture was 1000 p. s. i. instead of 1400.

Example IV

2% by weight of $Ca_3(PO_4)_2$ was used in place of the 4% $Ca(H_2PO_4)_2$ in Example I; also the amount of orthophosphoric acid was increased to 9% by weight. Substantially the same results were obtained except the modulus of rupture was 970 p. s. i. instead of 1400 p. s. i.

The above examples are given by way of illushtration and are not intended to limit the invention to the specific details disclosed. The proportions, of course, may vary widely as has been heretofore pointed out. Other ingredients, particularly other refractory materials, may be present preferably in new amounts. The principle reactions which take place to produce the bonded brick of this invention are as follows:

$Ca(H_2PO_4)_2 + 2H_3PO_4 + 3SiO_2 \rightarrow$
$2SiP_2O_7 + CaSiO_3 + 5H_2O$
$CaHPO_4 + H_3PO_4 + 2SiO_2 \rightarrow SiP_2O_7 + CaSiO_3 + 2H_2O$
$Ca_3(PO_4)_2 + 2H_3PO_4 + 5SiO_2 \rightarrow 2SiP_2O_7 + 3CaSiO_3 + 3H_2O$ While we have described certain preferred embodiments of our invention, many modifications may be made in the same without departing from the spirit of the invention; and we do not wish to be limited to the detailed examples, formulas and proportions of ingredients herein set forth, but desire to avail ourselves of all changes within the scope of the appended claims.

We claim:

1. The method of making a silica brick which comprises mixing granulated alpha quartz particles with orthophosphoric acid and a calcium phosphate, the amount of phosphate and orthophosphoric acid being such as to give a $P_2O_5$ content of about 4–15% by weight of the mixture, water being present in a weight ratio of $H_2O$ to $H_3PO_4$ of not more than one to three.

2. The method of making a silica brick which comprises mixing granulated silica particles with 2.5–4% by weight of the silica, of a member of a group consisting of monocalcium phosphate, dicalcium phosphate and tricalcium phosphate, and about 7%, by weight of the silica, of concentrated orthophosphoric acid, forming the composition into a brick and heating the brick at a temperature of 680–900° F. to provide a water resistant silicon pyrophosphate bond.

3. The method of making a silica brick which comprises mixing a silica composition consisting essentially of 90% fine ganister and 10% silica flour, with 4%, by weight of the silica composition, of monocalcium phosphate, and 7%, by weight of the silica composition, of 75% concentrated orthophosphoric acid, forming the resultant mixture into bricks at a pressure of 3000 p. s. i. and heating at a temperature of 700° F. for three hours.

References Cited in the file of this patent

UNITED STATES PATENTS

| 1,420,284 | Rebuffat | June 20, 1922 |

FOREIGN PATENTS

| 674,247 | Great Britain | 1952 |

OTHER REFERENCES

Mellor: A Comprehensive Treatise on Inorganic and Theoretical Chemistry, 1947, pp. 990 and 991, volume 6.

UNITED STATES PATENT OFFICE

CERTIFICATE OF CORRECTION

Patent No. 2,802,750                                              August 13, 1957

John H. Veale et al.

It is hereby certified that error appears in the printed specification of the above numbered patent requiring correction and that the said Letters Patent should read as corrected below.

Column 1, line 19, for "Serial No. 255,876" read -- Serial No. 355,876 --.

Signed and sealed this 29th day of October 1957.

(SEAL)
Attest:
KARL H. AXLINE

Attesting Officer                                            ROBERT C. WATSON
                                                                      Commissioner of Patents